United States Patent
Sarat

[11] Patent Number: 6,151,647
[45] Date of Patent: Nov. 21, 2000

[54] VERSATILE INTERFACE SMART CARD

[75] Inventor: Jean-Marc Sarat, Belmont, Calif.

[73] Assignee: Gemplus, France

[21] Appl. No.: 09/048,009

[22] Filed: Mar. 26, 1998

[51] Int. Cl.[7] .................................................. G06F 13/00
[52] U.S. Cl. .......................... 710/103; 710/11; 710/102; 710/104; 710/105
[58] Field of Search ................... 710/103, 102, 710/104, 105, 129, 62, 8, 11

[56] References Cited

U.S. PATENT DOCUMENTS

| | | | |
|---|---|---|---|
| 5,581,708 | 12/1996 | Iijima | 709/213 |
| 5,594,233 | 1/1997 | Kenneth et al. | 235/492 |
| 5,613,159 | 3/1997 | Colnot | 710/11 |
| 5,638,530 | 6/1997 | Pawate et al. | 711/115 |
| 5,679,945 | 10/1997 | Renner et al. | 235/492 |
| 5,721,781 | 2/1998 | Deo et al. | 380/25 |
| 5,832,240 | 11/1998 | Larsen et al. | 710/105 |

Primary Examiner—Ario Etienne
Attorney, Agent, or Firm—Burns, Doane, Swecker & Mathis, L.L.P.

[57] ABSTRACT

A smart card that is compatible with multiple different protocols includes a standard set of contacts that comply with the protocols of a published standard, and another contact not designated by the standard which is used to indicate whether the card is to operate in a non-standard mode. When the card is to operate in the non-standard mode, a simple start-up procedure is employed which does not require strict timing constraints, enabling a less expensive interface device to be used. The interface device can be connected to any bus of a computer which operates in accordance with a desired non-standard protocol. Due to the flexibility and functionality offered by smart cards that have microprocessors incorporated therein, the multi-protocol smart card can be used to drive, or otherwise communicate with, any of a variety of peripheral devices, whether or not a personal computer is present in the system.

31 Claims, 4 Drawing Sheets

VERSATILE INTERFACE SMART CARD

FIELD OF THE INVENTION

The present invention is directed to microprocessor-based user cards, commonly known as "smart cards", and more particularly to a smart card that is capable of communicating with a variety of external devices using different protocols that are respectively associated with the various devices.

BACKGROUND OF THE INVENTION

The use of secure smart cards that provide information specific to an individual is becoming more prevalent in a number of different types of situations. Examples of such include electronic commerce, security access control and health care record maintenance. Each system which employs smart cards contains two fundamental components, namely the smart cards themselves and an interface device, commonly known as a reader. The smart cards are carried by the users of the system, and include a memory which stores information that is pertinent to the user's interaction with the system. In an electronic commerce system, for example, each smart card may contain the balance in an account maintained by the user, as well as details of account transactions. More recently, the smart cards also include microprocessors, which provide for an increased level of security over the information stored in the cards. The incorporation of microprocessors into the cards also enhances their flexibility, for instance by facilitating the storage of executable programs in the cards that can be used to provide expanded functionality.

The readers communicate with the cards in a secure manner to access the information stored therein. In one type of system, the card is inserted into a slot in the reader, which brings electrical contacts in the reader into engagement with mating contacts on the exterior of the card. The engaged contacts enable a microcontroller in the reader to communicate with the memory and/or microprocessor in the card. Typically, the reader is connected to a peripheral device that is associated with the particular type of system into which the reader is incorporated. In a security system, for example, the reader might be connected to an electronic lock that permits a door to be opened. In a banking system, the reader could be incorporated into an automatic teller machine.

To permit the cards and readers of different manufacturers to be compatible with one another, a set of standard specifications has been developed. One of the common standards that applies to smart cards and readers is ISO 7816, promulgated by the International Standards Organization. This standard provides specifications for the location of the electrical contacts on the exterior of the cards, as well as the functions of the electrical signals that are present at the respective contacts. In this regard, the standard provides for up to eight electrical contacts, although specific signals are defined for only five of these contacts. The standard also contains specifications for the power-up, or initialization, procedure that is carried out when a card is first inserted into the reader, and the protocol for communicating between the card and the reader.

Due to the need to comply with the published standards, a conventional card reader can turn out to be a relatively expensive item of equipment. For instance, the ISO standard requires that different respective signals be applied to the five designated contacts on the card in a specific sequence at predetermined times during the power-up procedure. As a result, the reader must include a controller which supervises the application and timing of these signals, thereby adding to its cost.

In many systems which currently employ smart cards, the number of users can be quite large. For example, in an electronic banking system, a considerable number of customers might be expected to access an automated teller machine each day. Consequently, the cost of the reader is amortized over a sufficient number of transactions that it can be readily justified by the provider of the services.

More recently, there has been a trend toward personalized types of smart card applications. For instance, the ability to execute software programs from a microprocessor-based smart card makes it desirable to be able to connect the card to a personal computer. One approach for doing this is to add a smart card reader to the computer, either as an integral device or as a peripheral add-on. However, due to the appreciable cost of a reader, personal computer users may not be inclined to adopt this approach. In contrast to large institutions such as banks and the like, individual computer users may not be able to amortize the cost of the reader over a sufficient number of transactions to justify its cost.

It is desirable, therefore, to provide a smart card system which does not require a relatively expensive reader to access the information and/or functionality present in a card. With such a capability, the smart card is able to directly communicate with a variety of different types of peripheral devices that do not require a protocol associated with ISO standards and the like. Consistent with this objective, however, it is further desirable to provide such a system which remains compatible with currently existing smart card systems that comply with established standards.

SUMMARY OF THE INVENTION

In accordance with the present invention, these objectives are achieved by providing a smart card that is compatible with multiple different protocols. In one embodiment, such a card is fully compatible with the protocols of the ISO standard and another, non-ISO, standard. One of the contacts of the card which is not designated by the standard is used to indicate whether the card is to operate in the ISO-standard mode, or in another mode. When no signal is present at this terminal, the card operates in the conventional ISO-standard mode. However, the presence of a predetermined signal provides an indication that the card is to operate in the non-ISO mode. In this case, a different start-up procedure can be employed which does not require the strict timing constraints associated with the ISO mode of operation. Consequently, a less expensive reader can be employed which may not require the type of controller that is associated with an ISO-compliant reader.

In a specific embodiment, the non-ISO mode can be one that is associated with standard communication protocols that are used in personal computers, such as PS/2, USB and the like. An interface device which communicates with a multi-protocol smart card can be connected to any bus of the computer which operates in accordance with the desired non-ISO protocol. In the case of PS/2, for example, the interface device can be connected between the keyboard and the CPU of the computer system. Whenever a smart card is inserted into such an interface device, it communicates with both the CPU and the keyboard in accordance with the PS/2 protocol.

The applications of the multi-protocol card are not limited to communications with personal computers. Due to the flexibility and functionality offered by smart cards that have microprocessors incorporated therein, the multi-protocol smart card can be used to drive, or otherwise communicate with, any of a variety of peripheral devices, whether or not a personal computer is present in the system.

Further features of the invention, and the advantages offered thereby, are explained in detail hereinafter, with reference to specific embodiments of the invention illustrated in the accompanying drawings.

DETAILED DESCRIPTION

To facilitate an understanding of the principles and features of the present invention, it is described hereinafter in the context of a specific embodiment. In particular, reference is made to an implementation of the invention in which a smart card can be connected to a personal computer. It will be appreciated, however, that the practical applications of the invention are not limited to this particular embodiment. Rather, the invention can be employed in a variety of different systems in which it is desirable to utilize the functionality of a smart card without the need for a reader that strictly conforms to published standards for smart cards.

Figure 1:
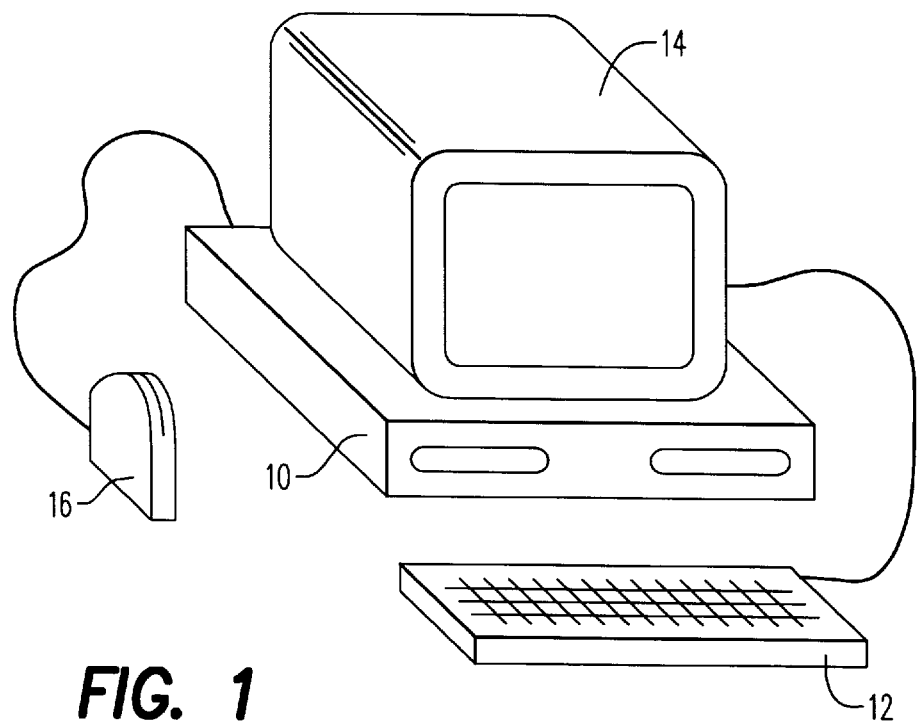
FIG. 1 is a perspective view of a personal computer system which is configured to operate with a smart card.

FIG. 1 is an illustration of a conventional personal computer system which is configured to operate with a smart card. As is typical, the computer system might include a central processing unit (CPU) 10 and the basic input and output devices that are employed by the user to interact with programs being executed by the CPU, such as a keyboard 12 and a monitor 14. In addition, the system shown in FIG. 1 includes a smart card reader 16 as another peripheral device. In a conventional arrangement, the reader conforms to the ISO standard, and the exchange of information between a smart card and the reader is carried out in accordance with a protocol established by that standard. The reader can be connected to the CPU via a standard input/output port, such as an RS232 serial port. Alternatively, the structure of the reader might be incorporated into the housing for the CPU or the keyboard, which would then include an appropriate slot for insertion of the smart card.

A configuration such as that shown in FIG. 1 might be desirable for a variety of different applications. At a first level, the smart card can be used to control access to the personal computer. For instance, before the user is allowed to run a particular program or open a sensitive file, he or she may be required to insert his or her personal smart card into the reader 16 and enter a password via the keyboard 12. In a known manner, the smart card and the reader communicate with one another to authenticate the password, and thereafter authorize the computer to operate in the manner commanded by the user. In a more sophisticated application, the smart card might include one or more personalized software programs which can be executed by the microprocessor in the smart card and interact with the CPU, such as an electronic banking program.

One of the concerns with a configuration such as that shown in FIG. 1 is the fact that the security of information pertaining to the smart card could be compromised. In particular, when the user enters his or her password via the keyboard, that information must pass through the control of the CPU in order to be presented to the smart card. This communication path is not entirely secure, since it is capable of being externally accessed. For instance, the CPU could be programmed to capture and store the user's password as it is being transmitted to the reader. The stored password could then be retrieved at a later time by a person who is not the rightful owner of the smart card.

As described previously, another concern is the fact that the reader itself can be relatively expensive, particularly if it is ISO-compliant. Because of the expense, many individual users may not desire to purchase such a device, and thereby forego the added functionality that a smart card would otherwise provide.

In accordance with the present invention, these concerns are alleviated by providing a smart card that is capable of operating in a mode other than that which is defined by the ISO standard. For instance, a smart card which can operate in accordance with the PS/2 protocol would be capable of communicating directly with the keyboard 12, without the intervention of the CPU, and thereby provide a more secure path for the transfer of personalized data, such as a password. In addition, when operating in such a mode, an ISO-compliant reader would not be required, thereby reducing the cost required to configure the computer to work with a smart card.

In a preferred embodiment of the invention, the smart card is capable of selectively operating in both a normal ISO-compliant mode, and at least one non-ISO mode, to optimize its utility. In this manner, the smart card can be used with established systems that are commonly associated with ISO readers, such as building access control, electronic banking transactions, and the like. In addition, it can also be used for other, less frequently employed features, such as to gain access to a protected personal computer.

Figure 2:
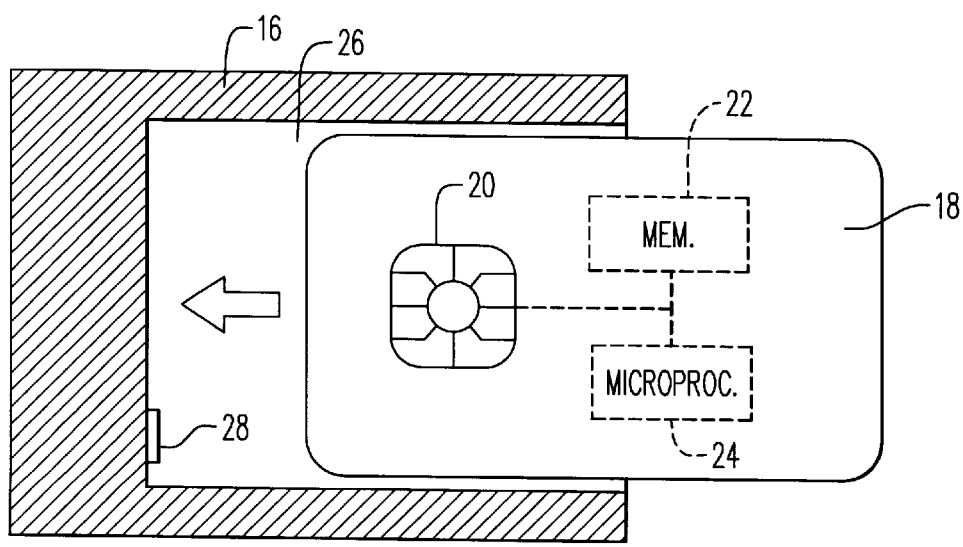
FIG. 2 is a plan view of a smart card and a reader.

The basic structure of a smart card system, insofar as it pertains to the present invention, is illustrated in FIG. 2. Generally speaking, a smart card 18 is a user card made of plastic or other suitable material, similar to a common credit card, and having a number of electrical contacts 20 on one exterior surface thereof. Embedded within the structure of the card is an electronic memory 22 and, in a preferred embodiment of the invention, a microprocessor 24. For ease of illustration, in FIG. 2 the memory 22 and microprocessor 24 are shown offset from the contacts 20, but in practice they can be located directly beneath the contacts. The dimensions of the card 18, and the arrangement and location of the contacts 20, are determined by applicable standards. The particular card shown in FIG. 2 has eight such contacts, although cards with only six contacts also comply with known standards.

The reader 16 has a slot 26 that is appropriately dimensioned to receive the card 18. The bottom of the slot has a switch 28, or other form of sensor, to detect when the card is fully inserted into the slot. The interior surface of the slot has a set of mating contacts (not shown), which engage corresponding contacts 20 on the card when it is fully inserted. When the sensor detects that a card is completely inserted into the slot 26 of the reader, it sends a signal which causes the reader to initiate a power-up procedure, described in detail hereinafter.

Figure 3A:
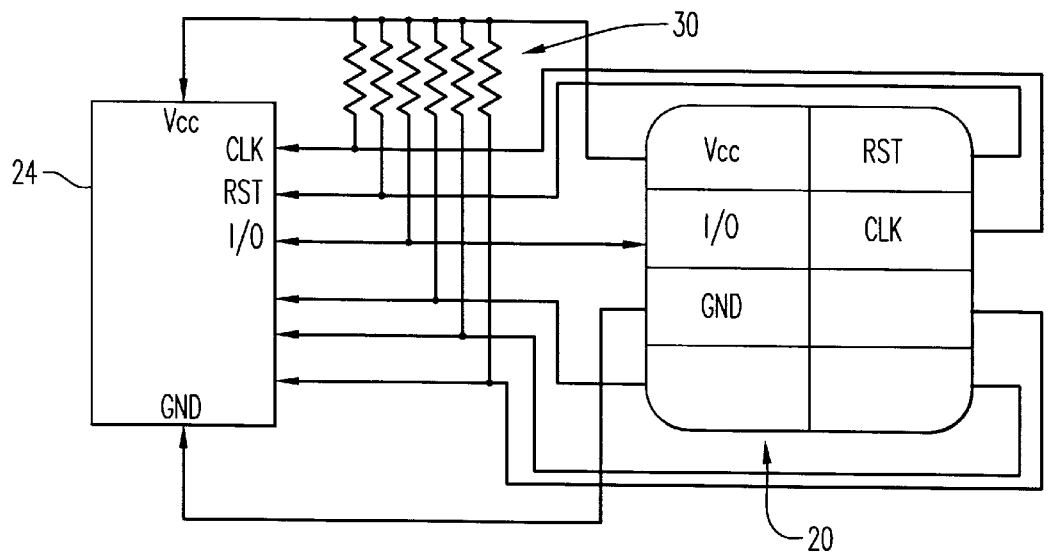
FIG. 3A is a more detailed view of the electronic components of a conventional smart card.

An expanded view of the contacts 20 on the smart card, and their connection to the internal microprocessor 24 of the card, is illustrated in FIG. 3A. Referring thereto, the ISO standard specifies the particular type of signal that is associated with five of the eight contacts. These signals include power (Vcc), ground, reset, clock and input/output. The other three contacts are not assigned to any signal, and therefore are not used under the ISO protocol. Each of the contacts 20 is connected to the microprocessor 24 by means of a pull-up resistor 30, so that, in the absence of a signal at a given contact, the input signal to the microprocessor 24 is at a logical high level. Hence, the signals at the three unassigned contacts always remain at the logic high level.

In operation, when a card 18 is inserted into the slot 26 of the reader 16, it actuates the sensor 28 when it reaches the end of travel in the direction of the arrow shown in FIG. 2. Upon receipt of a signal from the sensor, a microcontroller (not shown) within the reader applies the appropriate signals to the contacts 20 of the card, in a predetermined order specified by the ISO standard. Specifically, the standard requires that the ground reference potential be connected first, followed by the Vcc power supply voltage. Once the power is connected in this sequence, the clock signal is provided, and then a reset signal is applied. Thereafter, communications between the reader and the internal components 22, 24 of the card 18 are carried out via the I/O contact.

Figure 3B:
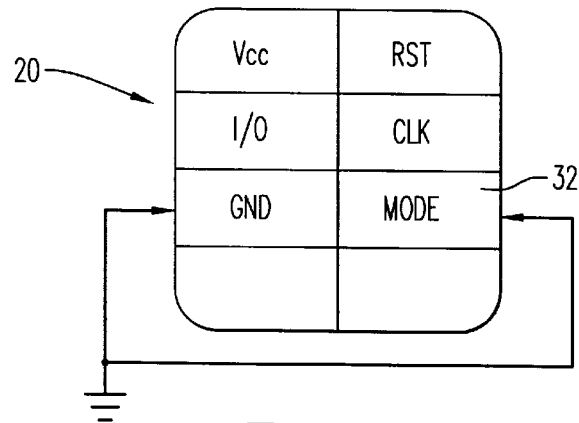
FIG. 3B is a detailed view of the electronic components of a smart card in accordance with a first embodiment of the present invention.

In accordance with the present invention, one or more of the unassigned contacts is used to expand the functionality of the smart card, by enabling it to operate in accordance with non-ISO protocols. FIG. 3B illustrates a first embodiment of the contact assignment for a smart card having multi-protocol capabilities. In this embodiment, a sixth contact 32 functions as a mode indicator. When the card is inserted into an ISO-compliant reader, no signal is presented to the mode contact. Consequently, the mode input signal to the card's microprocessor 24 is at a logic high level, as in the normal case. The microprocessor therefore operates in accordance with the standard ISO protocol.

The functionality of the mode contact also permits the card to be operated in accordance with a different type of protocol. In this context, the card is used with an interface device that applies a "non-ISO" mode signal to the mode contact 32. In a card of the type shown in FIG. 3A, where each of the inputs to the internal microprocessor 24 is normally pulled to a logic high level, the non-ISO mode signal would therefore be a logic low signal. As depicted in FIG. 3B, the interface device might connect the mode contact 32 directly to the ground reference potential that is also supplied to the GND contact. Upon detecting a low-level signal at the mode contact 32, the microprocessor 24 switches its mode of operation, to communicate in accordance with a predefined protocol other than the standard ISO protocol.

Figure 4:
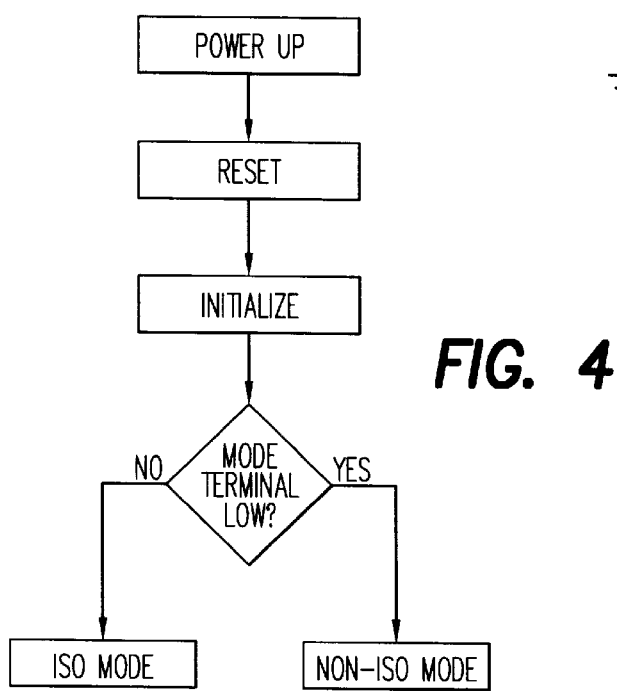
FIG. 4 is a flowchart of the general mode of operation of the present invention.

FIG. 4 illustrates a flow chart which depicts the operation of a smart card in accordance with the first embodiment of the invention. Referring thereto, when the card is fully inserted into the interface device, the microprocessor 24 is first powered up, and a reset signal is then applied from the interface device. In response to the reset signal, the microprocessor performs a standard initialization routine, and then checks the status of the input signal at the mode contact. If the mode signal is at a logic high level, this indicates that the card has been inserted in an ISO-compliant reader, and consequently the microprocessor 24 communicates via the I/O channel using the standard ISO protocol. If, however, the logic signal at the mode contact has been pulled low, the card's microprocessor communicates via the I/O channel using a non-ISO protocol, such as PS/2, USB or I2C, for example.

Figure 5A:
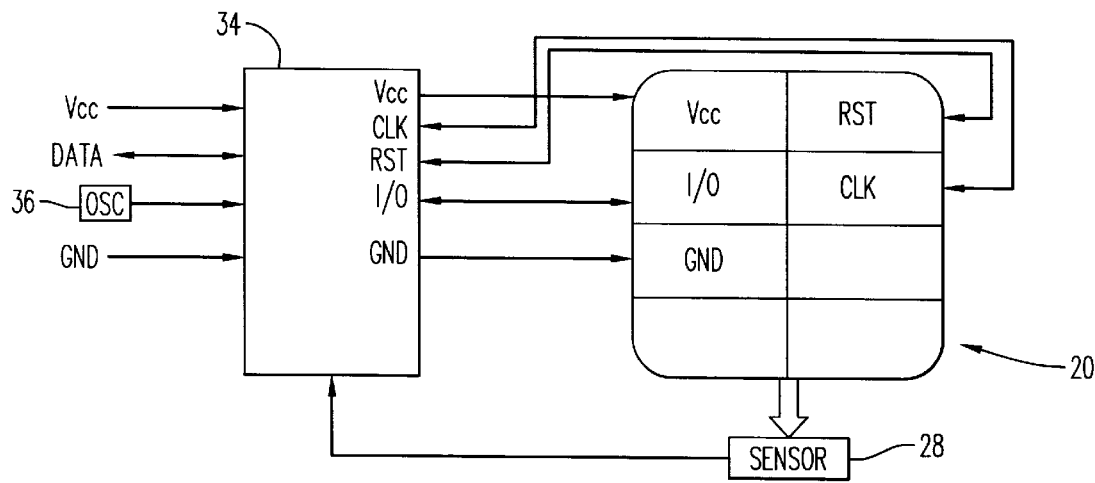
FIG. 5A is a block diagram of a reader that conforms to the ISO standard.

One advantage that arises from the ability to operate in a non-ISO mode is the fact the that interface device can be significantly simplified. FIG. 5A illustrates a reader that conforms to the ISO standard. That standard requires that each of the respective signals be applied to the five designated contacts of the card in a predetermined order, and with strictly controlled timing, during the power-up procedure. To provide the necessary control over the application of the signals, therefore, the reader 16 includes a microcontroller 34 which receives, as input signals, the Vcc and ground power signals, as well as a clock signal that is derived from a crystal oscillator 36, or the like. Depending upon the particular application, the microcontroller might receive data signals that are provided from an external source. The microcontroller 34 also receives a signal from the sensor 28, which indicates when the card 18 is fully inserted into the slot 26 in the reader. In response to this signal, the microcontroller controls the application of the respective signals to each of the five assigned contacts of the card.

Figure 5B:
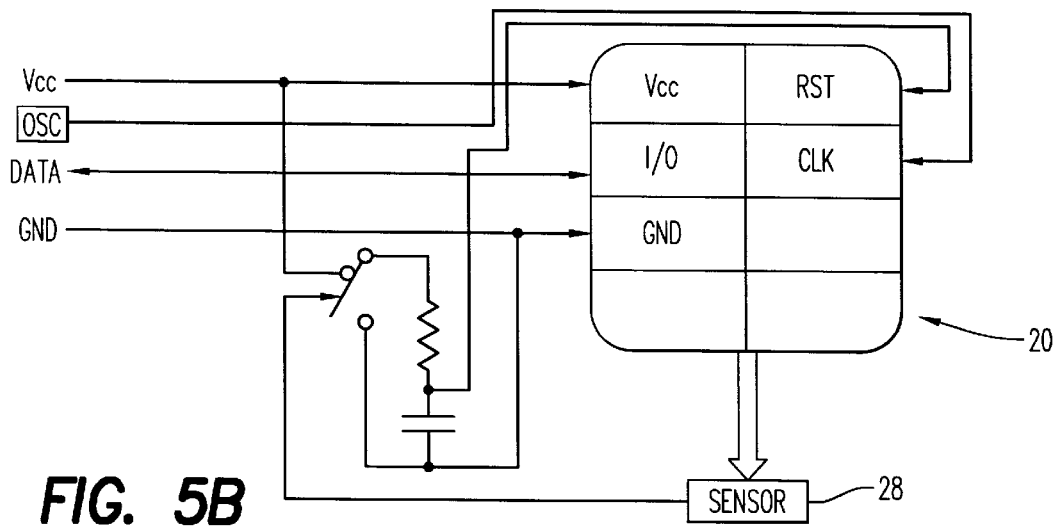
FIG. 5B is a schematic diagram of an interface device in accordance with the present invention.

In a non-ISO mode of operation, the timing requirements associated with the power-up procedure are not as rigid, and therefore a more conventional initialization circuit can be employed. For instance, the reset signal can be generated by a simple RC timing circuit, as illustrated in FIG. 5B. Upon receipt of a signal from the sensor 28, the RC timing circuit is actuated to apply a reset pulse to the appropriate contact 20 after a period of time that is determined by its timing constant. Hence, the need for a more expensive microcontroller can be eliminated, thereby reducing the cost of the interface device. Of course, any other suitable type of reset circuit can be employed as well. To distinguish this simplified interface device from a conventional ISO-compliant reader, it will be referred to herein as an adapter.

Figure 6:
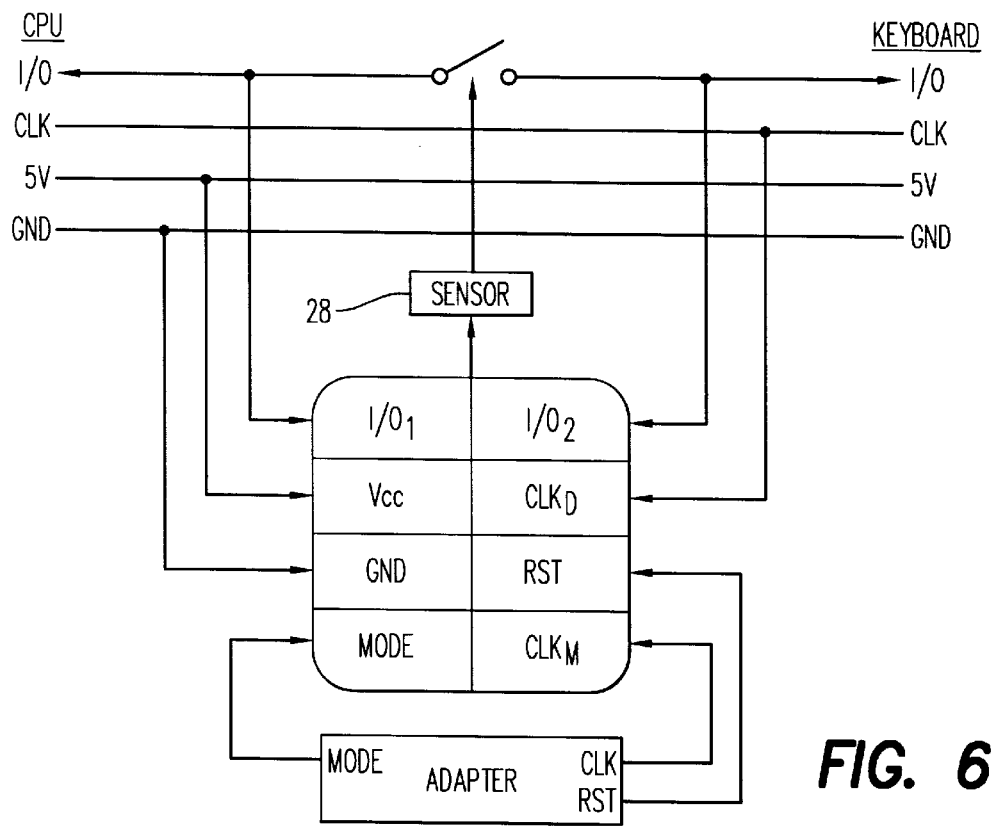
FIG. 6 is a block diagram of a second embodiment of the present invention.

Another advantage that stems from the ability to operate in accordance with different protocols lies in the fact that the card can communicate directly with devices that employ non-ISO protocols. This aspect of the invention is described in greater detail with reference to a second embodiment, which is schematically illustrated in FIG. 6. For ease of illustration, the layout of the contacts is rearranged in FIG. 6, relative to that shown in FIGS. 3 and 5. In this particular embodiment, the adapter, and hence the card, is located in the communication path between the CPU 10 and the keyboard 12 of a personal computer system. In a computer which utilizes the Micro Channel Architecture, for example, communications over the bus between the keyboard and the CPU are carried out in accordance with the PS/2 protocol. FIG. 6 illustrates the four basic signal lines that are present in this bus. These signal lines include the two power lines associated with the ground reference potential and a positive voltage, e.g. 5 volts. The other two lines constitute an input/output path for data signals, and a path for the data rate clock.

The adapter for the smart card is connected to the keyboard bus in the manner illustrated in FIG. 6. The two power lines are directly connected to the corresponding contacts of the adapter. In addition, the clock line of the keyboard bus is connected to one of the three terminals that are not designated according to the ISO standard. It is to be noted that the clock signal which appears on the keyboard bus is different from the clock signal that is applied to the internal microprocessor 24 of the card. Specifically, the clock which is applied to the microprocessor is one which controls the overall operation associated with the microprocessor, and is labeled $CLK_M$. This clock signal is applied to the usual clock terminal, by means of an oscillator 36 within the adapter, for example. In contrast, the clock signal $CLK_D$ which is obtained from the keyboard bus pertains to the rate at which data is transmitted over the I/O channel of the bus. Since this clock signal is not defined in the ISO standard, it is applied to one of the unassigned contact terminals.

A switch 38 is inserted in the I/O channel of the keyboard bus, to permit this channel to be opened whenever a card is inserted in the adapter. To this end, the switch is responsive to the sensor 28 which detects that the card is fully inserted into the adapter. In an exemplary embodiment, the switch can be mechanically opened by the card itself. The I/O channel on one side of the switch is connected to the normal I/O terminal of the smart card, which is labelled $I/O_1$. Another one of the normally unassigned terminals of the card constitutes a second I/O contact, and is connected to the I/O channel of the bus that is on the other side of the switch. When no card is inserted in the adapter, data is bidirectionally transmitted between the keyboard and the CPU over the bus I/O channel, in a normal fashion, with the switch closed. When a card is inserted into the adapter, the data passes through the two I/O terminals on the card. The smart card can operate in a passive mode or an active mode. In a passive mode, the data is simply transferred between the two I/O terminals, without disturbance. In an active mode, the microprocessor 24 in the card can receive data transmitted by either the CPU or the keyboard, and likewise can transmit data to either or both of these devices.

The direct connection between the smart card and each of the CPU and the keyboard provides a secure channel for the transfer of sensitive data. For example, in a situation where the user enters his or her password via the keyboard, that data is transmitted directly to the smart card, without going to the CPU. Once the proper password has been entered, the functionality provided by the smart card can then be employed in connection with the personal computer. For example, electronic banking transactions can be carried out in connection with account information that is securely stored in the smart card.

Figure 7:
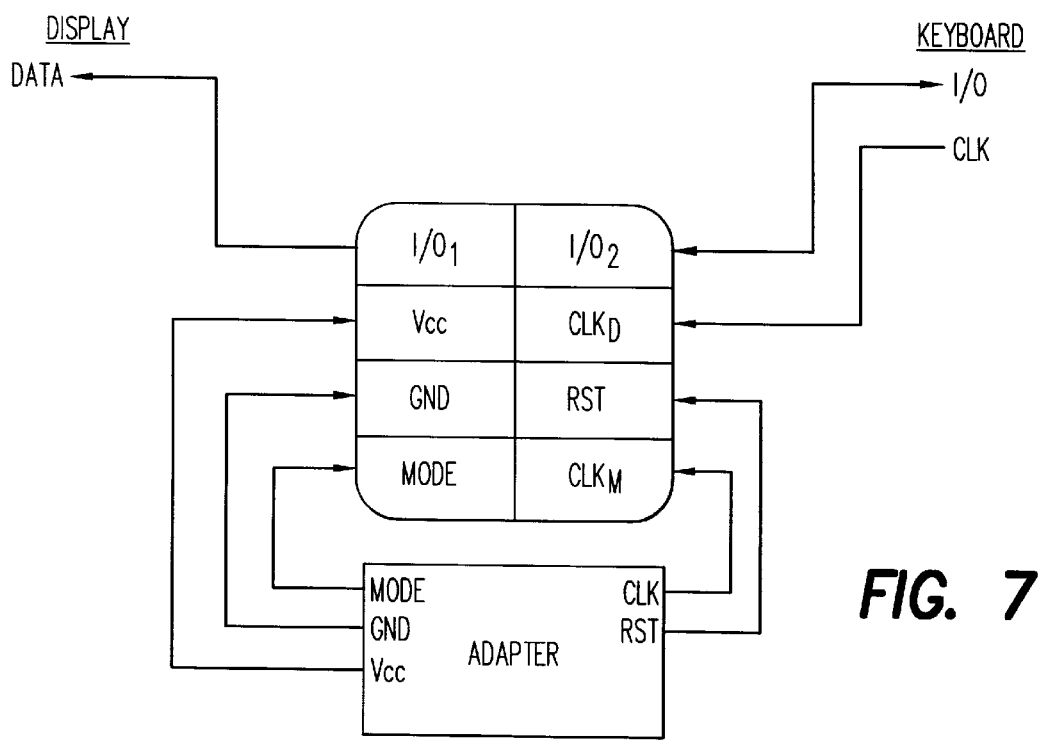
FIG. 7 is a block diagram of a third embodiment of the present invention.

From the foregoing, it will be appreciated that the ability to operate the smart card in accordance with different protocols permits the smart card to be used in connection with a variety of different types of peripheral devices. While the embodiment of FIG. 6 comprises a system that includes a personal computer with a keyboard, it is not necessary that an external CPU be present. Rather, the smart card could be used with standalone devices, such as a PIN pad for entering passwords, a display device, or a modem. The only requirement is that the peripheral device include an I/O channel and a data clock which can be accessed by the smart card, as in the embodiment of FIG. 6. As an example, FIG. 7 illustrates an embodiment in which the smart card is used to control a terminal which essentially comprises a keyboard and a display. All of the functionality that is needed to operate the terminal is contained within the smart card itself. One I/O contact of the smart card is used for bidirectional communications with the keyboard, and the other I/O contact functions to drive the display. A particular advantage of this arrangement resides in the fact that executable programs, such as applets written in the JAVA programming language, can be downloaded into the smart card, and then used to control the terminal to provide a variety of different functions. Since the JAVA programming language is not platform specific, the terminal need not be uniquely associated with a given card. Rather, terminals from a variety of different manufacturers can be operated with the same card.

This type of operation provides additional security as well. Since all of the operations of the terminal are managed by the card itself, there is no need to provide any form of intelligence within the terminal itself, or to store any secure type of information therein. Furthermore, while the multi-protocol card offers this expanded range of functionality, it still remains compatible with the ISO standard, and therefore can be used for conventional smart card applications.

It will be appreciated by those of ordinary skill in the art that the present invention can be embodied in other specific forms without departing from the spirit or essential characteristics thereof. For example, while the disclosed embodiments depict a card which can selectively operate in accordance with two protocols, it is possible to employ a greater number of protocols for a greater flexibility. For instance, the mode contact 32 can indicate whether the card is to operate pursuant to the ISO protocol or a non-ISO protocol. If a non-ISO protocol is to be used, data provided over one of the I/O channels can identify any one of a plurality of different protocols to be used with the adapter in the non-ISO mode.

The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A multi-protocol smart card system, comprising:
   a user card containing a microprocessor and associated memory, and a plurality of contacts for transferring data to and from said microprocessor and memory, said contacts including a first set of contacts respectively associated with a set of signals that conform to a first protocol, and at least one other contact for controlling said microprocessor to operate in accordance with a second protocol; and
   an interface device for receiving said user card, and having:
   a first set of mating contacts which correspond to the first set of contacts in said user card, to transfer said signals that conform to said first protocol,
   a mode contact that corresponds to said other contact of the user card, and
   a mode signal generator that provides a signal at said mode contact which causes said microprocessor to operate in accordance with said second protocol mode when the user card is received in said interface device.

2. The smart card system of claim 1, wherein said first protocol is an ISO protocol that pertains to smart cards, and said second protocol is a non-ISO protocol.

3. The smart card system of claim 2 wherein said non-ISO protocol is selected from the group comprising PS/2, USB and I2C protocols.

4. The smart card system of claim 1, wherein said microprocessor selectively operates in accordance with a plurality of non-ISO protocols in accordance with a signal provided by said mode signal generator.

5. The smart card system of claim 1, wherein said other contact of the user card is not used when said microprocessor operates in accordance with said first protocol.

6. The smart card system of claim 5, wherein said other contact is normally maintained at a predetermined logic level during operation in accordance with said first protocol, and said mode signal generator switches said other contact to a different logic level when the microprocessor is to operate in accordance with said second mode.

7. The smart card system of claim 6 wherein said different logic level is a ground reference potential.

8. The smart card system of claim 1 wherein said interface device further includes a reset signal generator for applying a reset signal to one of the contacts of the user card.

9. The smart card system of claim 8 wherein said reset signal is applied to one of the contacts of said first set of contacts.

10. The smart card system of claim 8 wherein said reset signal generator comprises an RC timing circuit.

11. In a transaction system of the type in which a user card having a microprocessor communicates with an interface device to perform a transaction, a method for selectively operating said microprocessor in one of a plurality of modes, comprising the steps of:

placing a user card in an operative relationship with an interface device so as to permit signals to be exchanged between the user card and the interface device;

providing signals to the user card from the interface device by means of a predefined set of communication contacts associated with a first operating protocol;

selectively providing a mode signal to the user card from the interface device in accordance with a mode of operation associated with the interface device;

determining within the microprocessor of the user card whether the mode signal is being provided by the interface device; and operating said microprocessor in accordance with said first operating protocol when said mode signal is not being provided, and operating said microprocessor in accordance with a second operating protocol different from said first protocol when said mode signal is being provided.

12. The method of claim 11 wherein said mode signal is provided to the user card by means of a communication contact other than the contacts of said predefined set of contacts.

13. The method of claim 11, wherein said first protocol is an ISO protocol that pertains to smart cards, and said second protocol is a non-ISO protocol.

14. The method of claim 13, wherein said non-ISO protocol is selected from the group comprising PS/2, USB and I2C protocols.

15. A user card for a multi-protocol smart card system, comprising:

a user card containing a microprocessor that is capable of selectively operating in accordance with a plurality of different operating protocols;

a first set of contacts on said user card for communicating signals to and from said microprocessor in accordance with a first one of said operating protocols;

at least one other contact on said user card for providing a mode signal to said microprocessor; and means associated with said microprocessor for determining whether a mode signal is provided to said other contact, and for causing said microprocessor to operate in accordance with said first protocol when a mode signal is not provided, and thereby communicate signals using only said first set of contacts, and to cause said microprocessor to operate in accordance with a second, different protocol when said mode signal is provided.

16. The user card of claim 15, wherein said first protocol is an ISO protocol that pertains to smart cards, and said second protocol is a non-ISO protocol.

17. The user card of claim 16 wherein said non-ISO protocol is selected from the group comprising PS/2, USB and I2C protocols.

18. An interface device for use in connection with a multi-protocol user card, comprising:

a first set of mating contacts which correspond to a first set of contacts in said user card that are respectively associated with a set of signals that conform to a first protocol, to transfer said signals that conform to said first protocol, a mode contact that corresponds to another contact of the user card, and a mode signal generator that provides a signal at said mode contact which causes a microprocessor in a user card to operate in accordance with a second protocol mode when the user card is received in said interface device.

19. The interface device of claim 18, wherein said first protocol is an ISO protocol that pertains to smart cards, and said second protocol is a non-ISO protocol.

20. The interface device of claim 19, wherein said non-ISO protocol is selected from the group comprising PS/2, USB and I2C protocols.

21. The interface device of claim 18, wherein said mode contact is normally maintained at a predetermined logic level during operation in accordance with said first protocol, and said mode signal generator switches said other contact to a different logic level when the microprocessor is to operate in accordance with said second mode.

22. The interface device of claim 21 wherein said different logic level is a ground reference potential.

23. The interface device of claim 18 wherein said interface device further includes a reset signal generator for applying a reset signal to one of the contacts of the user card.

24. The interface device of claim 23 wherein said reset signal is applied to one of the contacts of said first set of contacts.

25. The interface device of claim 23 wherein said reset signal generator comprises an RC timing circuit.

26. In a transaction system of the type in which a user card having a microprocessor communicates with an interface device to perform a transaction, a method for selectively operating said microprocessor in one of a plurality of different protocols for communication between the card and the interface device, comprising the steps of:

placing a user card in an operative relationship with an interface device so as to permit signals to be exchanged between the user card and the interface device;

providing signals to the user card from the interface device by means of a predefined set of communication contacts associated with a first communication protocol;

providing a mode signal to the user card from the interface device that is associated with a second communication protocol;

detecting within the microprocessor of the user card whether the mode signal is being provided by the interface device; and operating said microprocessor in accordance with said first communication protocol when said mode signal is not detected, and operating said microprocessor in accordance with second communication protocol when said mode signal is detected.

27. The method of claim 26 wherein said mode signal is provided to the user card by means of a communication contact other than the contacts of said predefined set of contacts.

28. The method of claim 26, wherein said first protocol is an ISO protocol that pertains to smart cards, and said second protocol is a USB protocol.

29. A user card for a multi-protocol smart card system, comprising:

a user card containing a microprocessor that is capable of selectively operating in accordance with a plurality of different communication protocols;

a first set of contacts on said user card for communicating signals to and from said microprocessor in accordance with a first one of said communication protocols;

at least one other contact on said user card for receiving a signal that is not associated with said first communication protocol; and means associated with said microprocessor for determining whether said signal is present at said other contact, and for causing said microprocessor to operate in accordance with said first protocol when said signal is not present, and to cause said microprocessor to operate in accordance with a second, different protocol when said signal is present.

30. The user card of claim 29, wherein said first protocol is an ISO protocol that pertains to smart cards, and said second protocol is a USB protocol.

31. The user card of claim 29 wherein said microprocessor communicates signals using only said first set of contacts when operating in accordance with said first protocol.

* * * * *